(12) United States Patent
Harirchi et al.

(10) Patent No.: US 11,685,282 B2
(45) Date of Patent: Jun. 27, 2023

(54) ELECTRIC VEHICLE CHARGING AGGREGATION

(71) Applicant: FORD GLOBAL TECHNOLOGIES, LLC, Dearborn, MI (US)

(72) Inventors: Farshad Harirchi, Ann Arbor, MI (US); Ryan O'Gorman, Beverly Hills, MI (US); David McCreadie, Ann Arbor, MI (US); Devang Bhalchandra Dave, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 17/178,944

(22) Filed: Feb. 18, 2021

(65) Prior Publication Data

US 2022/0258638 A1 Aug. 18, 2022

(51) Int. Cl.
*B60L 53/64* (2019.01)
*B60L 53/66* (2019.01)
*B60L 53/62* (2019.01)
*B60L 53/63* (2019.01)

(52) U.S. Cl.
CPC ............. *B60L 53/64* (2019.02); *B60L 53/62* (2019.02); *B60L 53/63* (2019.02); *B60L 53/665* (2019.02)

(58) Field of Classification Search
None
See application file for complete search history.

(56) References Cited

U.S. PATENT DOCUMENTS

| | | | |
|---|---|---|---|
| 8,615,355 B2 | 12/2013 | Inbarajan et al. | |
| 2010/0256846 A1* | 10/2010 | Shaffer | G06Q 10/06 701/22 |
| 2016/0075248 A1* | 3/2016 | Jeong | G06Q 50/06 320/162 |
| 2017/0259683 A1* | 9/2017 | Shimizu | B60L 53/64 |
| 2019/0275893 A1 | 9/2019 | Sham | |

FOREIGN PATENT DOCUMENTS

CN 103280822 A 9/2013

* cited by examiner

*Primary Examiner* — David V Henze-Gongola
(74) *Attorney, Agent, or Firm* — David B Kelley; Brooks Kushman P.C.

(57) ABSTRACT

A controller may, after receiving indication that an electric utility provider will reduce power supplied during an upcoming period of time, increase a cost of charge energy for vehicles that charge at a rate at least equal to a threshold rate during the upcoming period of time. The controller may also decrease the cost of charge energy for vehicles that avoid charging or charge at a rate less than the threshold rate during the upcoming period of time.

20 Claims, 4 Drawing Sheets

ELECTRIC VEHICLE CHARGING AGGREGATION

TECHNICAL FIELD

This application relates to charging of vehicle energy storage systems and methods of controlling the same.

BACKGROUND

Electrified vehicles may include a rechargeable high-voltage battery to provide power to the propulsion system as well as other vehicle systems. In general, the high-voltage battery requires power to be charged. A variable load can be introduced in cases where a number of electrified vehicles are connected to a power grid for charging at the same time.

SUMMARY

A system includes a controller that, after receiving indication that an electric utility provider will reduce power supplied during an upcoming period of time, increases a cost of charge energy for vehicles that charge at a rate at least equal to a threshold rate during the upcoming period of time.

A system includes a controller that, responsive to an indication that an electric utility provider will reduce power supplied during an upcoming period of time, requests that the electric utility provider alter a start or duration of the upcoming period of time based on data indicating whether vehicles scheduled to charge during the upcoming period of time will reduce a rate of charging.

A method includes decreasing a cost of charge energy for vehicles that avoid charging or charge at a rate less than a threshold rate during an upcoming period of time after receiving indication that an electric utility provider will reduce power supplied during the upcoming period of time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As mentioned earlier, the introduction of electric vehicles (EVs) may introduce a variable (and sometimes large) load on electricity grid infrastructures. Additional power generators may be required to accommodate the EV charging need. Additionally, the EV charging may cause a greater difference between peak times and off-peak times. Here, strategies for coordinating the EV charging between various entities including the EV users, vehicle manufacturers, power utility companies, power infrastructures, and the like are proposed.

According to aspects of the present disclosure, a charging framework may automatically coordinate electric power distribution by aggregating information for various entities to best accommodate the EV charging need based on utility capacity. This may involve the charging framework collecting power capacity information from the grid and utility entities, and collecting charging demand information from the vehicles and manufacturers. The charging framework may map the power capacity with the charging demand to strike a best balance between these two factors.

Figure 1:
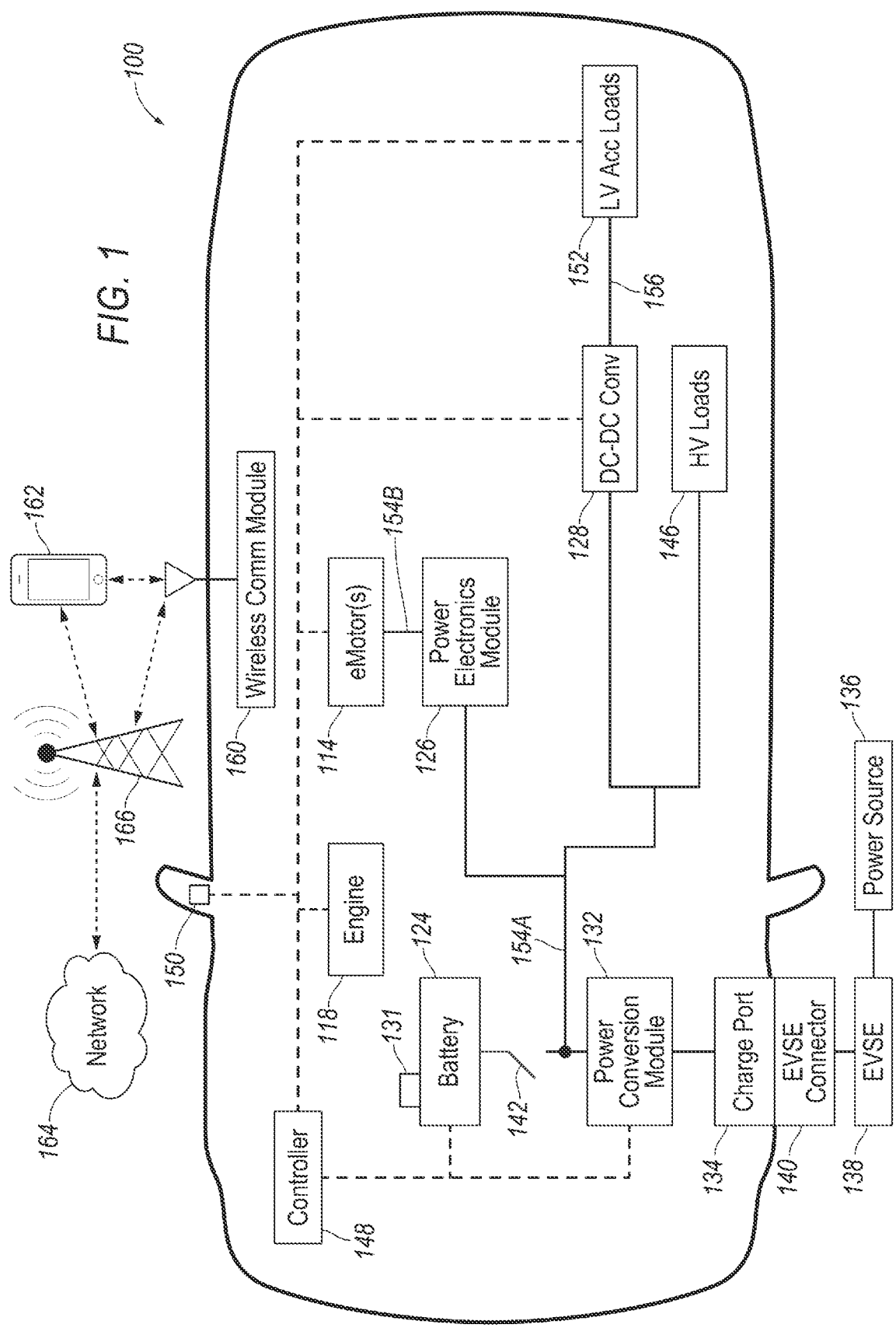
FIG. 1 is a schematic of a vehicle having an electrified propulsion system.

FIG. 1 depicts a plug-in hybrid-electric vehicle (PHEV) 100. The PHEV 100 includes an electrified propulsion system having one or more electric machines 114 mechanically coupled to a hybrid transmission (not shown). Each of the electric machines 114 may be capable of operating either as a motor or as a generator. In addition, the hybrid transmission is mechanically coupled to an internal combustion engine 118. The electric machines 114 are arranged to provide propulsion torque as well as deceleration torque capability either while the engine 118 is operated or turned off. The electric machines 114 are capable of operating as generators to provide fuel economy benefits by recovering energy that would normally be lost as heat in a friction braking system. The electric machines 114 may additionally impart a reaction torque against the engine output torque to generate electricity for recharging a traction battery while the vehicle is operating. The electric machines 114 may further reduce vehicle emissions by allowing the engine 118 to operate near the most efficient speed and torque ranges. When the engine 118 is off, the PHEV 100 may be operated in an electric-only drive mode using the electric machines 114 as the sole source of propulsion. The hybrid transmission is also mechanically coupled to road wheels to output torque from the electric machines 114 and/or combustion engine 118. While the topology of the hybrid vehicle 100 is provided by way of example, aspects of the present disclosure may be applicable to any vehicle having an electrified propulsion system. Specifically, any electrified vehicle capable of receiving power from a power grid, such as battery electric vehicles (BEV's), may benefit from the charging control systems and methods contemplated herein.

A chargeable energy storage system is provided as battery pack 124 that stores energy to power the electric machines 114 and other vehicle electrical loads. The battery pack 124 typically provides a high-voltage direct current (DC) output from one or more battery cell arrays, sometimes referred to as battery cell stacks, within the traction battery 124. Each battery cell array may include one or more battery cells. The battery cells, such as a prismatic, pouch, cylindrical, or other types of cells, are used to convert stored chemical energy to electrical energy. The cells may include a housing, a positive electrode (cathode), and a negative electrode (anode). An electrolyte allows ions to move between an anode and cathode during discharge, and then return during recharge. Terminals may allow current to flow out of the cell for use by the vehicle. Different battery pack configurations may be available to address individual vehicle variables including packaging constraints and power requirements. Discussed in more detail below, the battery cells may be thermally regulated by a thermal-management system. Examples of thermal-management systems include air cooling systems, liquid cooling systems, and a combination of air and liquid systems.

One or more contactors 142 may selectively isolate the traction battery 124 from a DC high-voltage bus 154A when opened and couple the traction battery 124 to the DC high-voltage bus 154A when closed. The traction battery 124 is electrically coupled to one or more power electronics modules 126 via the DC high-voltage bus 154A. The power electronics module 126 is also electrically coupled to the electric machines 114 and provides the ability to bi-directionally transfer energy between AC high-voltage bus 154B and the electric machines 114. According to some examples, the traction battery 124 may provide a DC current while the electric machines 114 operate using a three-phase alternating current (AC). The power electronics module 126 may convert the DC current to a three-phase AC current to operate the electric machines 114. In a regenerative mode, the power electronics module 126 may convert the three-phase AC current output from the electric machines 114 acting as generators to DC current compatible with the traction battery 124. The description herein is equally applicable to an all-electric vehicle without a combustion engine.

In addition to providing energy for propulsion, the traction battery 124 may provide energy for other vehicle electrical systems. The vehicle 100 may include a DC/DC converter module 128 that is electrically coupled to the high-voltage bus 154. The DC/DC converter module 128 may be electrically coupled to a low-voltage bus 156. The DC/DC converter module 128 may convert the high-voltage DC output of the traction battery 124 to a low-voltage DC supply that is compatible with low-voltage vehicle loads 152. The low-voltage bus 156 may be electrically coupled to an auxiliary battery 130 (e.g., a 12-volt battery). The low-voltage loads 152 may be electrically coupled to the low-voltage bus 156. The low-voltage loads 152 may include various controllers within the vehicle 100.

The traction battery 124 of vehicle 100 may be recharged by an off-board power source 136. The off-board power source 136 may be a connection to an electrical outlet. The external power source 136 may be electrically coupled to a charging station or another type of electric vehicle supply equipment (EVSE) 138. The off-board power source 136 may also be an electrical power distribution network or grid as provided by an electric utility company. The EVSE 138 provides circuitry and controls to regulate and manage the transfer of energy between the power source 136 and the vehicle 100. The off-board power source 136 may provide DC or AC electric power to the EVSE 138. The EVSE 138 includes a charge connector 140 for plugging into a charge port 134 of the vehicle 100. The charge port 134 may be any type of port configured to transfer power from the EVSE 138 to the vehicle 100. The charge port 134 may be electrically coupled to a charge module or on-board power conversion module 132. The power conversion module 132 conditions power supplied from the EVSE 138 to provide the proper voltage and current levels to the traction battery 124. The power conversion module 132 interfaces with the EVSE 138 to coordinate the delivery of power to the vehicle 100. The EVSE connector 140 may have pins that mate with corresponding recesses of the charge port 134. Alternatively, various components described as being electrically coupled or connected may transfer power using wireless inductive coupling or other non-contact power transfer mechanisms. The charge components including the charge port 134, power conversion module 132, power electronics module 126, and DC-DC converter module 128 may collectively be considered part of a power interface system configured to receive power from the off-board power source 136.

When the vehicle 100 is plugged in to the EVSE 138, the contactors 142 may be in a closed state so that the traction battery 124 is coupled to the high-voltage bus 154 and to the power source 136 to charge the battery. The vehicle may be in the ignition-off condition when plugged in to the EVSE 138.

The traction battery 124 may also have one or more temperature sensors 131 such as thermistors or other types of temperature sensors. The temperature sensor 131 may be in communication with the controller 148 to provide data indicative of temperature of the battery cells. The vehicle 100 may also include temperature sensor 150 to provide data indicative of ambient air temperature. In the example of FIG. 1, the temperature sensor 150 is disposed in a vehicle side mirror, but it should be appreciated that the temperature sensor may be located anywhere on the vehicle suitable to detect ambient temperature.

One or more high-voltage electrical loads 146 may be coupled to the high-voltage bus 154. The high-voltage electrical loads 146 may have an associated controller that operates and controls the high-voltage electrical loads 146 when appropriate. The high-voltage loads 146 may include compressors and electric heaters related to the vehicle climate control system 158. For example, the vehicle climate control system may draw high-voltage loads in the range of 6 kW-11 kW under high cooling loads. According to some examples, the rechargeable battery 124 powers at least a portion of the climate control system.

The vehicle 100 further includes at least one wireless communication module 160 configured to communicate with external devices over a wireless network. According to some examples, wireless communication module includes a BLUETOOTH transceiver to communicate with a user's mobile device 162 (e.g., cell phone, smart phone, PDA, or any other device having wireless remote network connectivity). The mobile device 162 can in turn be used to communicate with a network 164 outside the vehicle 100 (i.e., the "cloud") through, for example, communication with a cellular tower 166. In some examples, tower 166 may be a WiFi access point. Data provided to the wireless communication module 160 may be passed to other vehicle modules that control functions related to battery charging. Since the vehicle is equipped with the wireless communication module for telematics and other purposes, there is no need for additional hardware to the system according to examples of the present disclosure. In specific examples, one or more control modules may use data transmitted from a remote utility provider for charging system control and to adjust charging patterns.

Data may be communicated between the wireless communication module 160 and a remote network utilizing, for example, a data-plan, data over voice, dual tone multi frequency (DTMF) tones, or a wired connection (not shown) associated with the mobile device 162. Alternatively, the wireless communication module 160 may include an onboard modem (not shown) having antenna in order to exchange data with the network 164 over the voice band. According to some examples, the controller 148 is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In a further example, mobile device 162 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can utilize the entire bandwidth. Further data transfer protocols may also be suitable according to aspects of the present disclosure, such as Code Domain Multiple Access (CDMA), Time Domain Multiple Access (TDMA), and Space-Domain Multiple Access (SDMA) for digital cellular communication.

The various components discussed may have one or more associated controllers to control, monitor, and coordinate the operation of the components. The controllers may communicate via a serial bus (e.g., Controller Area Network (CAN)) or via discrete conductors. In addition, a vehicle system controller 148 may be provided to coordinate the operation of the various components.

The system controller 148, although represented as a single controller, may be implemented as one or more controllers. In some examples, multiple controllers located on the vehicle cooperate to perform algorithms discussed herein. In other examples, the controller or portions of the controller may be located on a server external to the vehicle. In additional examples, a central fleet server may collect aggregate data from a plurality of vehicles to enhance confidence regarding predicted user behavior, cost trends, charging rates, charging preferences/requirements, and/or other variables influencing charging. The central fleet server may further collect aggregate data from a plurality of utility and infrastructure entities to obtain information of a power supply capacity in one or more area in which the vehicles are located so as to better coordinate the power distributions. In further examples, the controller or portions of the controller may be located at a charging station and regulate charging events based on data transmitted from the vehicle or other sources.

The controller 148 may monitor operating conditions of various vehicle systems. According to the example of FIG. 1, at least the electric machines 114, engine 118, traction battery 124, DC-DC converter 128, power conversion module 132, and high-voltage loads 146, low-voltage loads 152, and wireless communication module 160 are in communication with the controller 148.

The controller 148 also generally includes any number of subcomponents such as microprocessors, ASICs, ICs, memory (e.g., FLASH, ROM, RAM, EPROM and/or EEPROM) and software code to co-act with one another to perform various operations. The subcomponents allow onboard processing of commands and execute any number of predetermined routines according to a desired timing or alternatively in response to one or more inputs received from vehicle systems. The processors may be coupled to non-persistent storage and/or persistent storage. In an example configuration, the non-persistent storage is RAM, and the persistent storage is flash memory. In general, persistent (non-transitory) storage can include all forms of storage that maintain data when a computer or other device is powered down. The controller 148 may also store predetermined data within the memory, such as "look up tables" that are based on calculations and/or test data. The controller communicates with other vehicle systems and sub-controllers over one or more wired or wireless vehicle connections and may use common bus protocols (e.g., CAN and LIN). Used herein, references to "a controller" may refer to one or more controllers.

The traction battery 124 includes a current sensor to output a signal indicative of a magnitude and direction of current flowing into or out of the traction battery 124. The traction battery 124 also includes a voltage sensor to sense a voltage across terminals of the traction battery 124. The voltage sensor outputs a signal indicative of the voltage across the terminals of the traction battery 124. The traction battery 124 may also have one or more temperature sensors 131 such as thermistors or other types of temperature sensors. The temperature sensor 131 may be in communication with the controller 148 to provide data indicative of temperature of the battery cells.

The current sensor, voltage sensor, and temperature sensor outputs of the traction battery 124 are all provided to the controller 148. The controller 148 may be programmed to compute a state of charge (SOC) based on the signals from the current sensor and the voltage sensor of the traction battery 124. Various techniques may be utilized to compute the state of charge. For example, an ampere-hour integration may be implemented in which the current through the traction battery 124 is integrated over time. The SOC may also be estimated based on the output of the traction battery voltage sensor 104. The specific technique utilized may depend upon the chemical composition and characteristics of the particular battery.

A desired temperature operating range may also be specified for the traction battery. The temperature operating range may define upper and lower thermal limits within which the battery 124 is operated. Battery temperature may affect changing and/or energy depletion rates. In response to a sensed temperature approaching a thermal limit, operation of the traction battery 124 may be modified or other mitigation actions may be initiated to actively regulate temperature. According to some example configurations, the traction battery 124 as well as other vehicle components are thermally regulated with one or more thermal-management systems.

Figure 2:
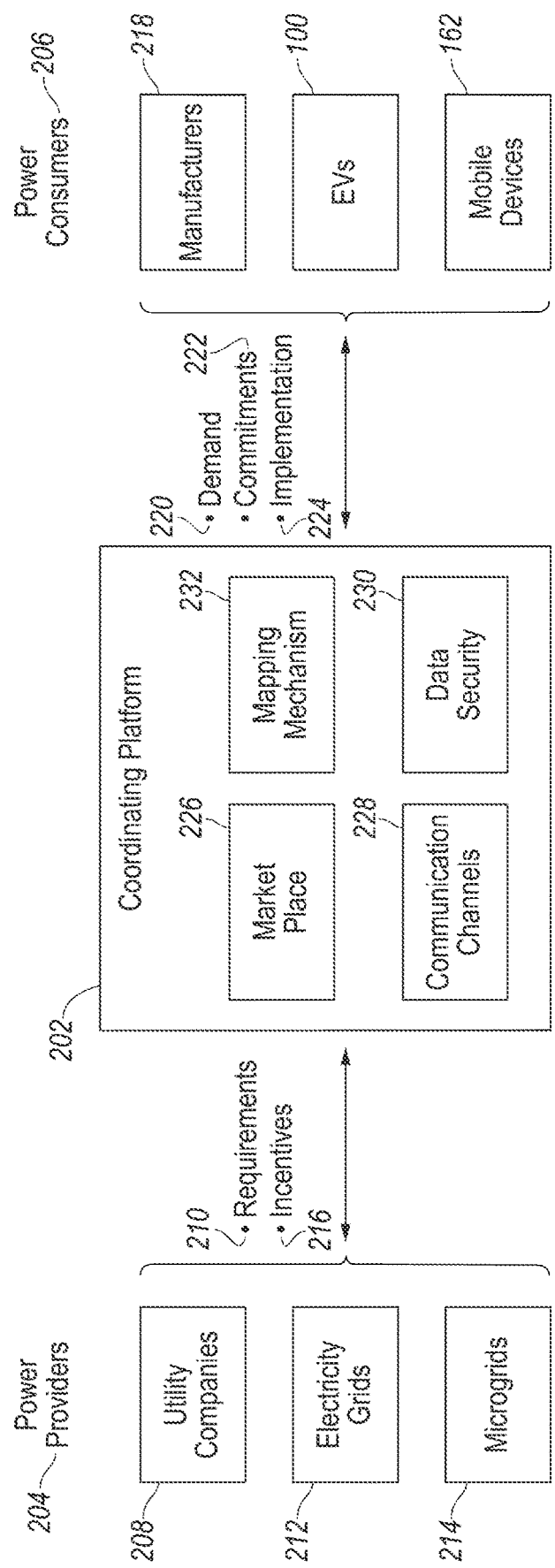
FIG. 2 is a system diagram of the charging framework.

FIG. 2 depicts a system diagram of vehicle charging system 200. The vehicle charging system 200 may be include a coordinating platform 202 configured to perform routines that coordinate the vehicle charging based on requirements from the power providers 204 and demands from the power consumers 206 communicated via an interface (not shown). With continuing reference to FIG. 1, the coordinating platform 202 may be implemented via a server as a part of the network 164 as a non-limiting example. The power providers 204 may include various entities generating and/or delivering electric power to various consumers. As a few non-limiting examples, the power providers 204 may include one or more utility companies 208 generating and managing power generation and supplies to the consumers 206. The utility companies 208 may apply different pricing tiers based on the location and usage time of the consumers 206. Consumers located at one location may be charged a higher or lower rate compared with consumers located at another location. Additionally, the utility companies 206 may charge a higher rate at peak time (e.g. 7 AM-10 PM) and a lower rate at off-peak time (e.g. 10 PM-7 AM). Furthermore, each utility company may have an output capacity at a given time that is predictable based on the method that the electricity is generated. For example, some utility companies generate electricity using renewable energy in addition to conventional power plants. For the power generated by wind turbines, a higher output capacity may be anticipated for a windy day based on the weather forecast. Similarly, the utility companies 208 may anticipate a higher output power generated by solar panels on a sunny day as compared to lower output power on a rainy day and at night. The pricing tiers and anticipated output power may be sent to the coordinating platform 202 for processing and aggregation as a requirement 210. The power providers 204 may further include electricity grid companies 212 operating infrastructures (e.g., transmission line, transformers) for distributing the power generated by the utility companies 208 to the consumers 206. The electric grid companies 202 may have a distributing capacity variable by location and events (e.g., maintenance work). The distributing capacity as well as the events may be sent to the coordinating platform 202 as a part of the requirements 210 for processing. The power providers 204 may further include one or more localized microgrid entities 214 generating and distributing in a discrete manner. The microgrids 214 may generate electricity using renewable energy similar to the renewable energy of the utility companies discussed above. The current and anticipated status and capacity of the microgrids may be sent to the coordinating platform 202 as a part of the requirements 210. In addition to the requirements 210, the power providers 204 may further send incentives 216 to the coordinating platform 202 to reward the power consumers 206 for complying with the requirements 210. The incentives 216 may include client credits, discount for further purchase or the like.

The power consumers 206 may include various entities. For instance, the power consumers 206 may include the vehicles 100 and the mobile devices 162 associated with the vehicles 162. Battery status and charging demand of each vehicle 100 may be reported to one or more corresponding manufacturer (original equipment manufacturer (OEM)) 218 associated with the vehicles 100 for consolidation. Alternatively, each of the manufacturers 218, the vehicles 100, and the mobile devices 162 may be configured to individually send the charging demand 220 to the coordinating platform 202 for processing. The charging demand 220 may include information about a required charging amount at a specific time for a vehicle 100. For instance, the vehicle 100 and/or the mobile device 162 associated with the vehicle may determine that at least 70% SOC is needed at 7 AM the next day based on the user schedule obtained via a calendar application. The target charge of 70% SOC may be reported to the coordinating platform 202 as the charge demand. The power consumers 206 may further communicate commitments 222 and implementations 224 of the charging strategy to the coordinating platform 202, which is discussed in detail below.

The coordinating platform 202, in general, may be configured to aggregate the information received from both the power providers 204 and the power consumers 206 to determine a charging strategy to accommodate the needs from both parties. The coordinating platform 202 may further monitor the implementation of the charging strategy and distribute the incentives accordingly. The coordinating platform 202 may include various components to facilitate the processing and transactions. For instance, the coordinating platform 202 may include a marketplace module 226 to facilitate the transactions. The marketplace module 226 may be configured to manage pricing mechanisms and evaluate the performance of individual power consumers in satisfying their commitments. Incentives may be distributed to consumers 206 responsive to their corresponding commitments being satisfied. The marketplace 226 module may further provide penalties (e.g., higher rate) to individuals if the commitments are not implemented. The marketplace 226 may further enable a bidding mechanism which allows the power consumers 206 to bid into the electricity market. For instance, if extra power capacity from the providers 204 is available at a given time and location, consumers 206 may be allowed to bid for the extra power capacity through the marketplace module 226.

The coordinating platform 202 may further include one or more communication channels 228 protected by one or more data security mechanisms 230 to communicate and store data from various entities. The communication channels 228 may be configured to facilitate the adoption of any new parties from both the providers 204 and consumers 206. For instance, the communication channel may be a standard integrating platform such as the Open Vehicle-Grid Integration Platform (OVGIP) which utilizes software applications to connect various nodes involved in providing and managing energy to EVs. The data security mechanism 230 may be used to enhance data privacy and isolation as each entity involved in the framework may be unwilling to share their data with anyone else. For instance, one OEM 218 is unlikely to be willing to share its customers' data with another OEM 218. Data received by the coordinating platform 202 may be anonymized before it can be processed. The coordinating platform 202 may further include a mapping mechanism 232 configured to match the requirements 210 with the demand 220. The mapping mechanism may utilize a charging profile for each vehicle 100 stored in the coordinating platform 202 and/or at the OEM 218 to automatically adapt and match the power supply with demand. The charging profile may reflect a charging preference (e.g., charging power limit) and battery status (e.g., battery health) of the traction battery 124 of the vehicle 100 to allow the mapping mechanism to better perform the mapping process. As a non-limiting example, the mapping mechanism 232 may process and aggregate the requirements 210 and incentives 216 from the power providers 204, which may include an amount of energy that needs to be shifted from the peak time to the off-peak time in a given area. The requirements 210 and incentives 216 may further include a grid event notice to stop charging of some or all EVs 100 in an area and the prices or incentives that the power providers 204 are willing to pay for satisfying those requirements (e.g., through the marketplace 226). With the data aggregated, the mapping mechanism 232 may then evaluate the requirements 210 and incentives 216, and determine the capacity to deliver one those requirements 210, and as a result estimate the commitments 222 to respond to the providers 204. The determination and estimation may be performed using predictive algorithms, optimization, and game theory concepts while the inputs are the incentives 216 and historical data from the power consumers 206 in the given area. Responsive to the approval from the power providers 204, the mapping mechanism 232 may map the EV population commitments into individual EV commitments. The individual EV commitments may be directly and automatically implemented on individual EVs as charging schedules that satisfy the EV owner's energy requirements. The system structure illustrated in FIG. 2 is merely one example of the present disclosure and alternative implementation may be used to perform the operations of the system under substantially the same principle. For instance, the mapping mechanism 232 may be implemented fully or partially via one or more power consumers 206 in an alternative example.

Figure 3:
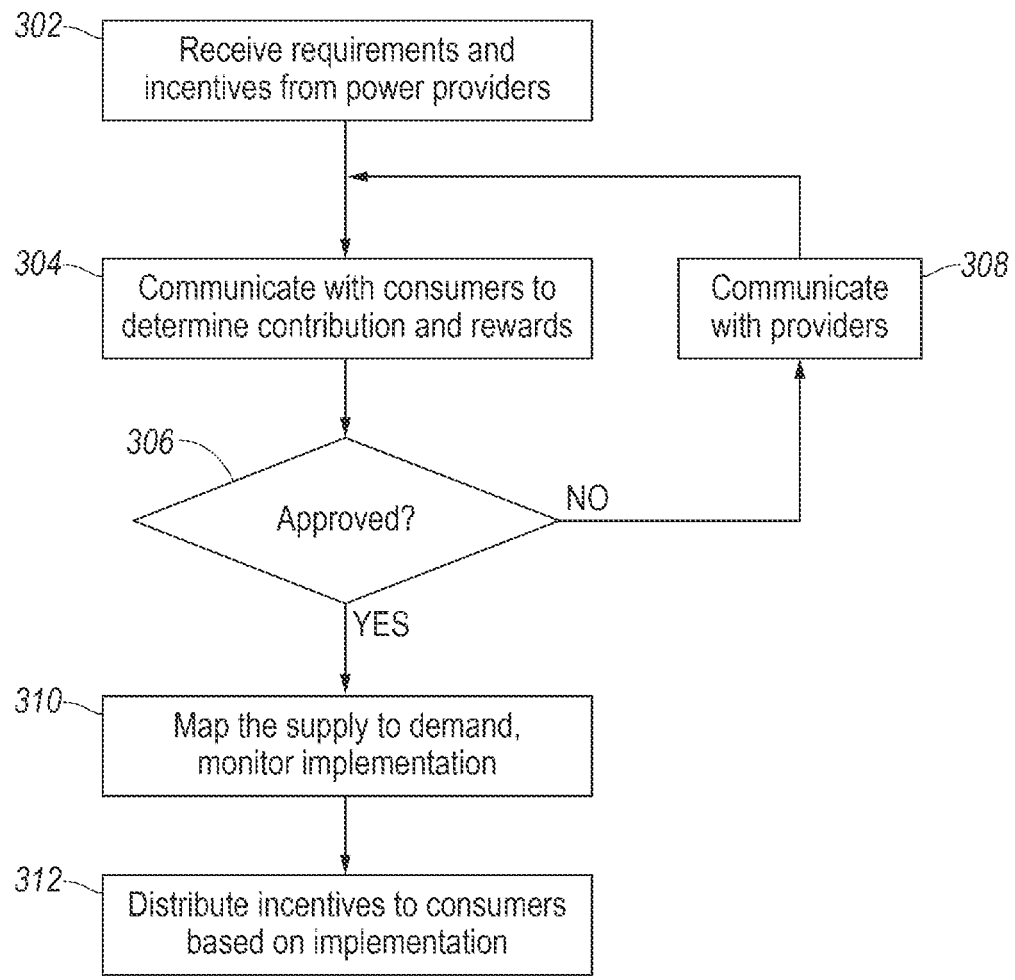
FIG. 3 is a flow diagram of one embodiment of the present disclosure.

FIG. 3 illustrate a process 300 of one embodiment of the present disclosure. At operation 302, the coordinating platform 202 receives the requirements 210 and incentives 216 from the power providers 204. The requirements may include information about one or more grid events which will reduce the power supply to the consumers in a given period of time. At operation 304, the coordinating platform 202 communicates the requirements 210 and incentives 216 with the power consumers 206 to determine a contribution that each participating consumer 206 can make to the events. As an example, the coordinating platform 202 may individually communicate with each of the participating consumers 206 to determine the available contribution therefrom via the marketplace 226. Alternatively, the coordinating platform 202 may communicate with one or more manufacturer 218 to collectively determine the contribution of the vehicles 100 that are managed by each respective manufacturer 218. Alternatively, responsive to receiving the requirements 210 and incentives 216, the coordinating platform 202 may evaluate and predict the contributions from the consumers 206 using the historical data from the consumers 206 and the charging profile associated with each vehicle 100. Responsive to collecting sufficient information from the consumers 206, the coordinating platform 202 reports the collected information to the providers 204 to seek an approval of the contributions by the consumers 206. If the providers 204 do not approve the contributions, the process returns to operation 304 to recommunicate with the consumers 206 in an attempt to seek more contributions. Additionally, the coordinating platform 202 may communicate with the power providers 204 to delay or shift the grid events and increase the power supply at operation 308. In other circumstances, the coordinating platform 202 may communicate with the respective manufacturer 218 or vehicles 100 to request they alter a start time for charging or avoid charging all together during the grid events. If the answer for operation 306 is a yes, the process proceeds to operation 308 and the coordinating platform 202 implements the power commitment as planned and monitors the implementation of the contributions. In reality, the implementation of the power contribution may deviate from the committed power contribution due to various reasons. The deviation may be more significant if the contributions are evaluated and predicted by the mapping mechanism without communicating with the consumers 206. At operation 312, the coordinating platform 202 distributes the incentives/rewards to the consumers 206 based on the implementation results. In general, the rewards distributed to each consumer 206 may be proportional to the contribution made (i.e., reduced charge amount). Additionally, a penalty mechanism may be imposed by the marketplace 226. For instance, a consumer may be penalized if it does not deliver the amount of committed contribution. The marketplace 226 may adjust the reward using the penalty. As discussed above, in case the implemented contribution of an entity deviates from the committed contribution, the coordinating platform 202 may only penalize the entity responsive to the deviation if greater than a threshold. The deviation threshold and penalty may be adjustable depending on the specific circumstances. For instance, a higher deviation threshold and smaller penalty may be used for commitments predicted by the coordinating platform 202 whereas a lower threshold and large penalty may be used for commitments explicitly submitted by the vehicle 100 and/or the associated mobile device 162.

Figure 4:
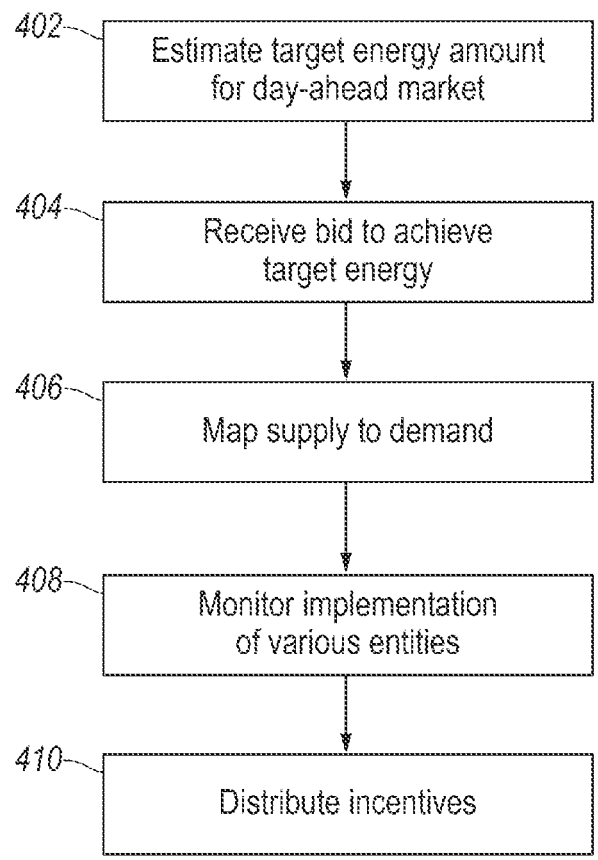
FIG. 4 is a flow diagram of another embodiment of the present disclosure.

FIG. 4 illustrates a process 400 of another embodiment of the present disclosure. At operation 102, the coordinating platform 202 estimates a target energy amount for a future time (e.g., a day-ahead market) within a given area. The target energy amount may be estimated based on a charging demand 220 received from the consumers as well as the historical data of charging pattern/preference of the vehicles 100. At operation 404, the coordinating platform 202 posts the target energy to the marketplace 226 and receives bids from various entities aiming to achieve the target. The bidding may be open to various entities participating in the energy market in the given area. For instance, the bidding may be open to one or more of the power providers 204 each bidding to generate a certain amount of energy at a certain price. The bidding may be further open to the vehicle owners and OEMs 218 that make the commitment to reduce the energy consumption within the given period of time. As an example, the coordinating platform 202 and/or the OEM 218 may predict with sufficient level of confidence that an electric vehicle 100 will be plugged in from 7 PM tonight until 7 AM next morning (i.e., 12 hours plug-in time), while the charging amount of that vehicle may only require 2 hours of active charging time. The OEM 218 and/or the vehicle 100 may bid to the marketplace 226 to commit not to start the charging during the rush hours (e.g., 7 PM-10 PM) although the vehicle may be plugged-in to receive incentives in return. The bidding may be further open to non-vehicle energy consumers (e.g., households, businesses) to commit to reduce the power consumption (e.g., turning off AC) during a given period of time for rewards. With the bids received, at operation 406, the coordinating platform 202 maps the power supply of the power providers 204 to the power demand of the power consumers 206 as summarized to deliver the committed capacity. At operation 408, the coordinating platform 202 monitors the implementation of power supply and consumption of the committed entities. At operation 410, the coordinating platform 202 distributes the incentives to the complying entities. The coordinating platform 202 may further issue penalties to entities violating the commitments similar to operations 310 and 312 as discussed above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. In some embodiments as suggested above for example, a controller may, after receiving indication that an electric utility provider will reduce power supplied during an upcoming period of time, increase a cost of charge energy for vehicles that charge at a rate at least equal to a threshold rate during the upcoming period of time. Similarly, the controller may decrease the cost of charge energy for vehicles that charge at a rate less than the threshold rate or avoid charging during the upcoming period of time. An amount of the increase or decrease may depend on the rate. The electric utility provider may define the threshold rate. The controller may also request that the electric utility provider alter a start or duration of the upcoming period of time based on data from the vehicles. This data may include an indication as to whether the vehicles will charge at a rate less than the threshold rate or avoid charging during the upcoming period of time. The controller may further request that the vehicles alter a charge start time to avoid charging during at least a portion of the upcoming period of time.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system comprising:
a controller programmed to, after receiving indication that an electric utility provider will reduce power produced during an upcoming duration of time, increase a cost of charge energy for vehicles that charge at a rate at least equal to a threshold rate during the upcoming duration of time, and request that the electric utility provider shorten the upcoming duration of time during which the power produced will be reduced based on data from the vehicles.

2. The system of claim 1, wherein the controller is further programmed to request that the electric utility provider alter a start of the upcoming duration of time.

3. The system of claim 2, wherein the data includes an indication as to whether the vehicles will charge at a rate less than the threshold rate or avoid charging during the upcoming duration of time.

4. The system of claim 1, wherein the controller is further programmed to request that the vehicles alter a charge start time to avoid charging during at least a portion of the upcoming duration of time.

5. The system of claim 1, wherein the controller is further programmed to, responsive to receiving, from the electric utility provider, a message specifying a time and location, estimate an energy saving commitment for the time and location using historical electronic charging data of the vehicles, and receive a payment from the electric utility provider, wherein an amount of the payment is based on implementation of the energy saving commitment.

6. The system of claim 5, wherein the controller is further programmed to receive a bid from one of the vehicles, and further estimate the energy saving commitment using the bid.

7. The system of claim 5, wherein the controller is further programmed to distribute a reward to the vehicles and wherein the reward corresponds to an energy saving of each vehicle for the time and location.

8. The system of claim 1, wherein an amount of the increase depends on the rate.

9. The system of claim 1, wherein the controller is further programmed to decrease the cost of charge energy for vehicles that charge at a rate less than the threshold rate or avoid charging during the upcoming duration of time.

10. The system of claim 9, wherein an amount of the decrease depends on the rate.

11. The system of claim 1, wherein the threshold rate is defined by the electric utility provider.

12. A system comprising:
a controller programmed to, responsive to an indication that an electric utility provider will reduce power supplied during an upcoming period of time, request that the electric utility provider alter a start or duration of the upcoming period of time based on data indicating whether vehicles scheduled to charge during the upcoming period of time will reduce a rate of charging.

13. The system of claim 12, wherein the controller is further programmed to, request that the vehicles alter a charge start time to avoid charging during at least a portion of the upcoming period of time.

14. A method comprising:
decreasing a cost of charge energy for vehicles that avoid charging or charge at a rate less than a threshold rate during an upcoming duration of time after receiving indication that an electric utility provider will reduce power produced during the upcoming duration of time; and
requesting that the electric utility provider alter the duration of time during which the power produced will be reduced.

15. The method of claim 14, requesting that the electric utility provider alter a start of the upcoming duration of time based on data from the vehicles.

16. The method of claim 15, wherein the data includes an indication as to whether the vehicles will charge at a rate less than the threshold rate or avoid charging during the upcoming duration of time.

17. The method of claim 14, requesting that the vehicles alter a charge start time to avoid charging during at least a portion of the upcoming duration of time.

18. The method of claim 14, wherein an amount of the decrease depends on the rate.

19. The method of claim 14 further comprising increasing the cost of charge energy for vehicles that charge at a rate at least equal to the threshold rate during the upcoming duration of time.

20. The method of claim 19, wherein an amount of the decrease depends on the rate.

* * * * *